(12) United States Patent
Ando

(10) Patent No.: US 6,445,998 B2
(45) Date of Patent: Sep. 3, 2002

(54) ENGINE CONTROL UNIT USING PULSES OF DIFFERENT FREQUENCIES

(75) Inventor: Katsuyuki Ando, Kasugai (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 09/770,403

(22) Filed: Jan. 29, 2001

(30) Foreign Application Priority Data

Feb. 1, 2000 (JP) ........................................ 2000-024275

(51) Int. Cl.[7] .............................. F02P 5/15; G06F 19/00
(52) U.S. Cl. ................... 701/114; 123/406.63; 701/113
(58) Field of Search ...................... 123/406.61, 406.62, 123/406.63, 486; 73/116; 701/102, 103, 104, 105, 110, 113, 114; 324/207.25; 377/2

(56) References Cited

U.S. PATENT DOCUMENTS

| 3,914,580 A | * | 10/1975 | Watson et al. | ............... 123/486 |
| 5,469,823 A | * | 11/1995 | Ott et al. | ............... 123/406.62 |
| 5,630,396 A | * | 5/1997 | Fukui et al. | ............ 123/406.62 |
| 5,806,488 A | * | 9/1998 | Imberg | ................... 123/406.63 |
| 6,302,083 B1 | * | 10/2001 | Sekine et al. | ........... 123/406.62 |
| 6,341,253 B1 | * | 1/2002 | Honda | .................... 123/406.63 |

* cited by examiner

*Primary Examiner*—Willis R. Wolfe
(74) *Attorney, Agent, or Firm*—Nixon & Vanderhye P.C.

(57) ABSTRACT

In an engine control unit, a pulse interval in a crank signal having a pulse missing portion is measured. On the basis of the measured pulse interval, frequency multiplication signals of an integral multiple are generated by the next pulse. At the time of engine start, at least until the pulse missing portion in the crank signal is detected, the engine control is performed in accordance with a cam signal specifying a cylinder position and the crank signal. At predetermined timing after the pulse missing portion in the crank signal is detected, the engine control based on the frequency multiplication signals is executed while performing initialization at the pulse missing portion in the crank signal.

6 Claims, 9 Drawing Sheets

ENGINE CONTROL UNIT USING PULSES OF DIFFERENT FREQUENCIES

CROSS REFERENCE TO RELATED APPLICATION

This application is based on and incorporates herein by reference Japanese Patent Application No. 2000-24275 filed Feb. 1, 2000.

BACKGROUND OF THE INVENTION

The present invention relates to an engine control unit, and particularly to an engine control unit which controls an internal combustion engine by switching frequencies of rotation pulses based on engine operation conditions.

An engine control unit (ECU) is an electronic control unit for performing controls such as fuel injection control, ignition control, and idle speed control to operate an engine in an optimum state. Specifically, signals from various sensors for sensing engine operating states such as crank angle sensor and engine coolant temperature sensor are supplied to the ECU to control an optimum fuel injection amount, injection timing, ignition timing, and the like.

Controls synchronized with the engine speed such as ignition control and injection control, that is, controls synchronized with a crankshaft rotation position, are performed by generating a signal of ignition pulses or the like after elapse of offset (delay) time from a predetermined crankshaft rotation position indicated by the edge of a crank signal.

It is, however, necessary to perform an arithmetic operation for converting the angle to time. There is a demand for reduction in processing load and improvement in accuracy. Further, it is desired to provide ignition sparks immediately after starting engine operation.

SUMMARY OF THE INVENTION

It is therefore an object of the present invention to provide an engine control unit with reduced processing load and improved accuracy and, moreover, capable of effecting ignition immediately after starting engine operation.

According to the present invention, a pulse interval in a crank signal having a pulse missing portion is measured. On the basis of the measured pulse interval, frequency multiplication signals of an integral multiple are generated by the next pulse. At the time of engine start, at least until the pulse missing portion in the crank signal is detected, the engine control is performed in accordance with a cam signal specifying a cylinder position and the crank signal so that ignition can be effected immediately after starting engine operation. At predetermined timing after the pulse missing portion in the crank signal is detected, the engine control is switched to use the frequency multiplication signals while performing initialization at the pulse missing portion in the crank signal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to an embodiment, in which an engine control unit (ECU) is applied to a five-cylinder (#1–#5) four-cycle engine.

Figure 1:
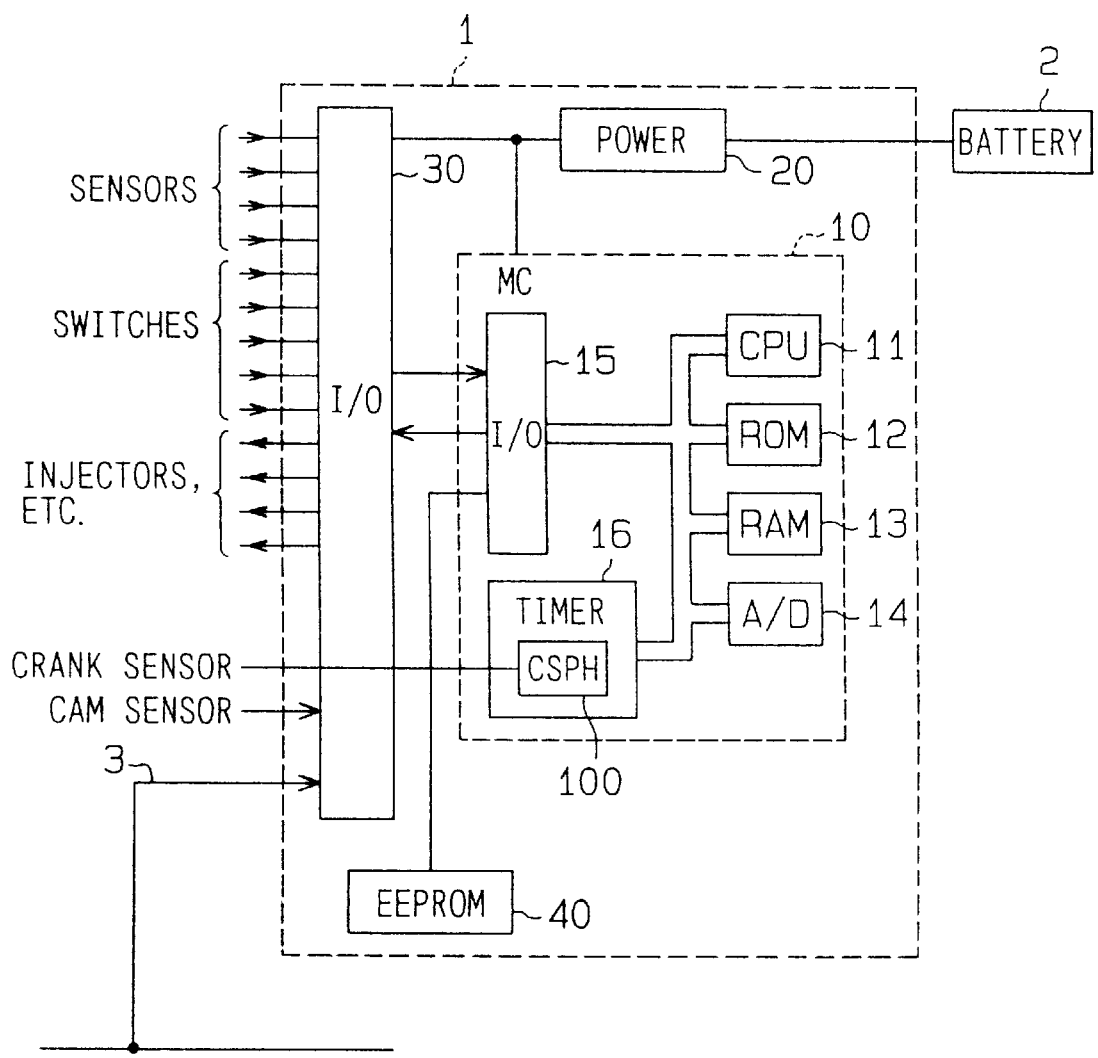
FIG. 1 is a block diagram showing an engine control unit (ECU) according to an embodiment of the present invention.

Referring to FIG. 1, an engine control unit (ECU) 1 has a microcomputer (MC) 10, a power supply circuit 20, an input/output circuit (I/O) 30, and an EEPROM 40. The power supply circuit 20 receives a supply of power from a battery 2 and supplies a predetermined voltage to various electronic circuit devices in the ECU 1. The microcomputer 10 has a CPU 11, a ROM 12, a RAM 13, an A/D converter 14, an input/output interface 15, and a timer module 16. The circuit devices transmit/receive data to/from each other via a data bus. The EEPROM 40 is connected to the input/output interface 15, and the circuit devices transmit/receive data to/from the EEPROM 40 via the input/output interface 15.

The input/output circuit 30 receives signals from sensors, switches, and the like, and outputs drive signals to injectors (fuel injection valves) and an igniter. Further, a communication line 3 is connected to the input/output circuit 30 and data is transmitted/received to/from other ECUs (not shown) via the input/output circuit 30. The CPU 11 in the microcomputer 10 receives signals (data) from the sensors, switches, and the like and data from the communication line 3 via the input/output circuit 30 and the input/output interface 15 and executes various arithmetic operations on the basis of the data to control the injectors and the like via the input/output interface 15 and the input/output circuit 30.

Figure 2:
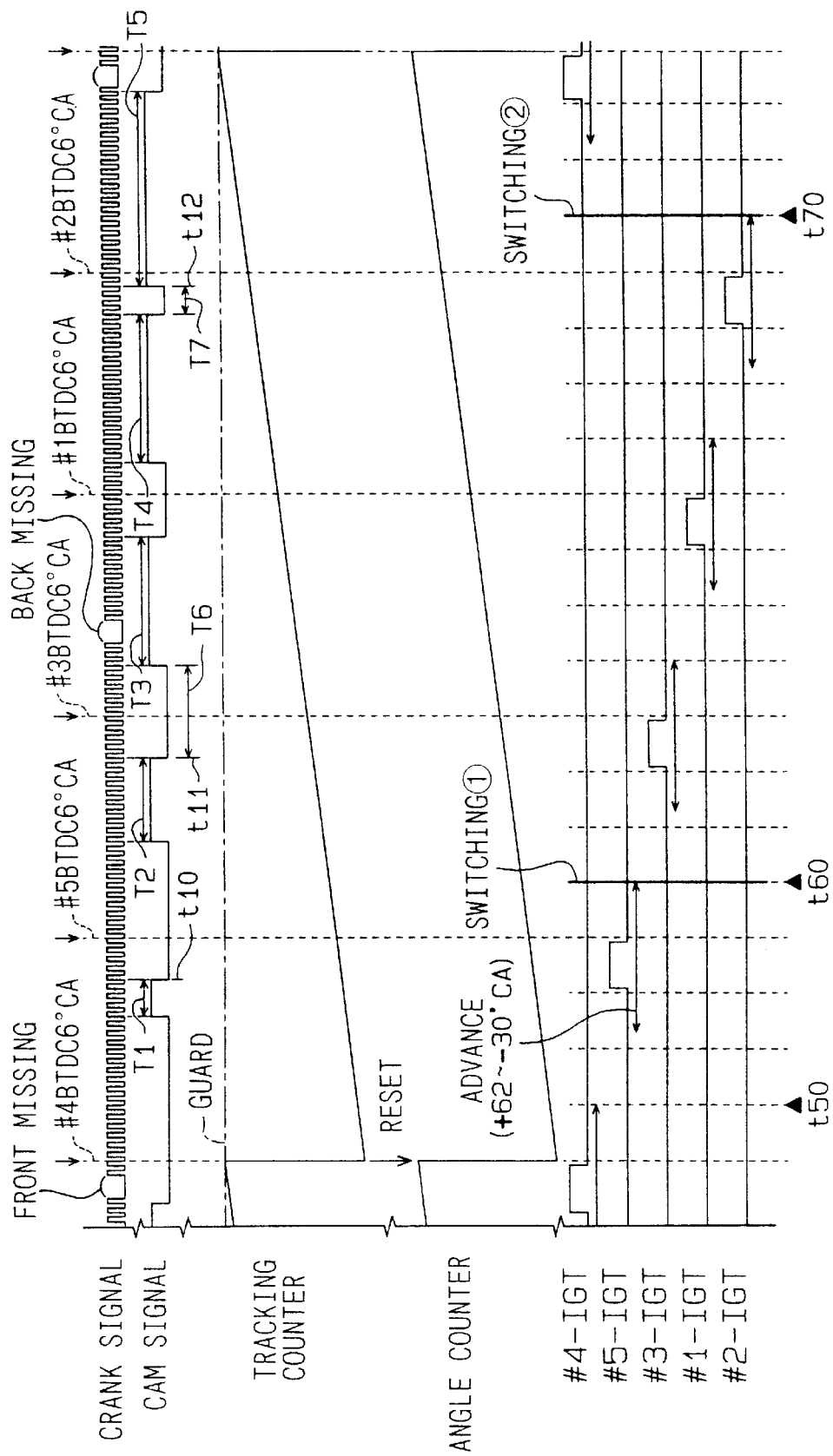
FIG. 2 is a time chart showing various signals generated in one cycle (720° CA) of an engine in the embodiment.

The signals received by the ECU 1 include a crank signal from a crank angle sensor and a cam signal from a cam angle sensor. FIG. 2 shows the crank signal and the cam signal in one cycle, that is, 720° crank angle (CA) rotation of the crankshaft of the engine. In FIG. 2, ignition coil energization signals for ignitions of the first to fifth cylinders (#1 to #5) are shown as #1-IGT to #5-IGT. Ignition spark is generated at the trailing edge of each IGT signal.

The crank signal generated by the crank angle sensor is a pulse train of every predetermined angle interval corresponding to rotation of the crankshaft of the four-cycle engine. The crank signal has a pulse missing portion (reference position in rotation of the crankshaft) in which pulses are missing in the pulse train to indicate the reference position of the crankshaft based on which delay angles of starting fuel injection and ignition are measured. In the crank signal in the embodiment, two pulses are skipped every 60 pulses so that the pulse train has 58 pulses in 360° CA (one rotation of the crankshaft). Specifically, the pulse interval in the pulse train is 6° CA, and the pulse missing portion is provided every 360° CA in the pulse train. One (pulse missing portion of every 720° CA) of the pulse missing portions is defined as a front pulse missing portion and the other one (pulse missing portion of every 720° CA subsequent to the first one) is defined as a back pulse missing portion.

The cam signal generated by the cam angle sensor is synchronized with the rotation of the camshaft of the engine and is a cylinder determination signal for specifying the cylinder position. The trailing edge of the cam signal is provided every 144° CA due to five-cylinder construction of the engine.

The crank signal is supplied to a crank signal processing hardware (CSPH) 100 in the timer module 16 in FIG. 1. The cam signal is received by the microcomputer 10 via the input/output circuit 30. The crank signal processing hardware 100 provided in the timer module 16 is a functional unit for processing the crank signal in a hardware manner. A process on the crank signal (generation of angle signals by dividing crank edge interval) of FIG. 2 can be performed by the crank signal processing hardware 100 in a hardware manner.

Figure 3:
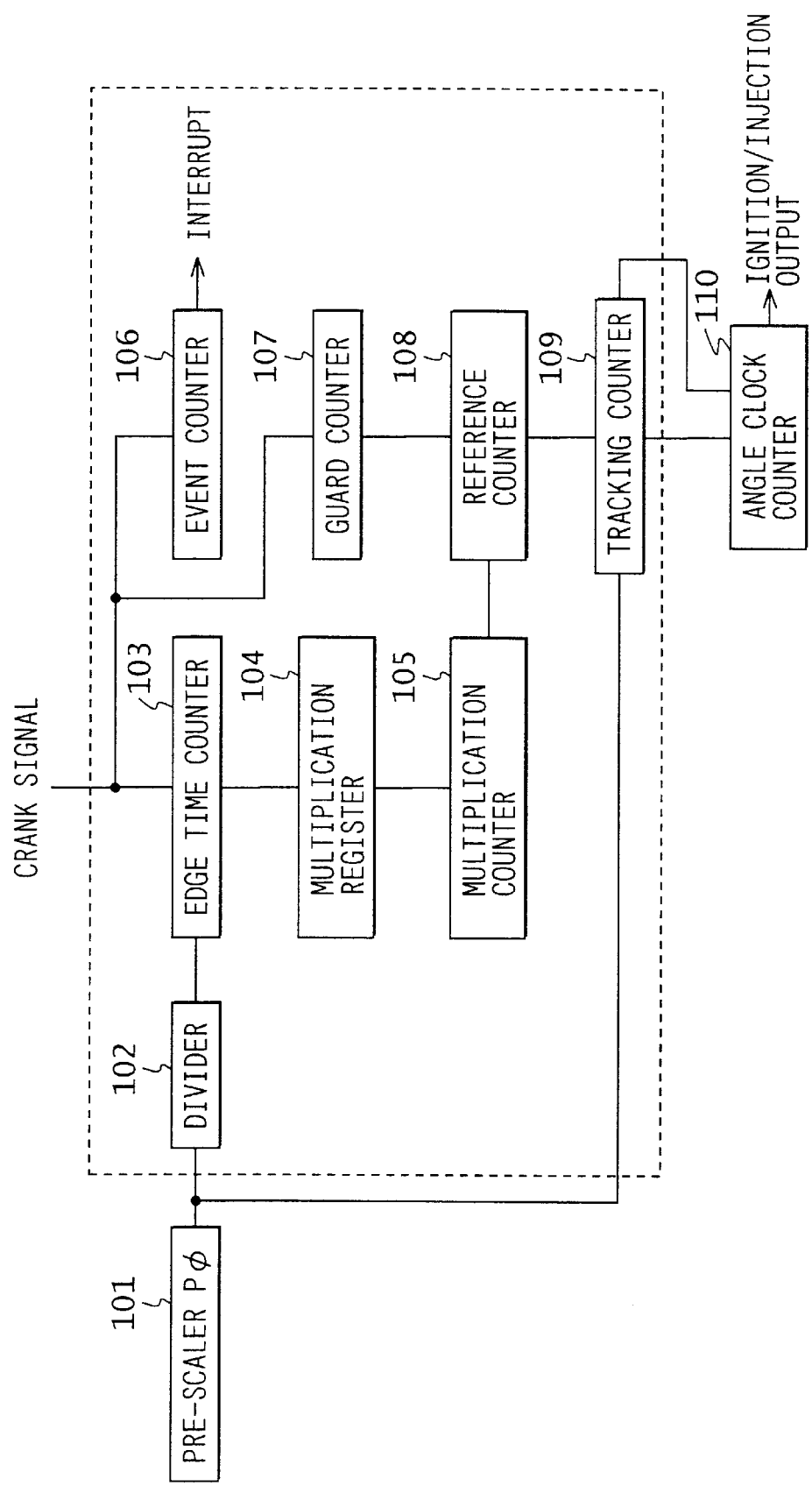
FIG. 3 is a circuit diagram of crank signal processing hardware used in the embodiment.

As shown in FIG. 3, the crank signal processing hardware 100 has a pre-scaler 101, a frequency divider 102, an edge time measuring counter 103, a frequency multiplication register (edge time storing register) 104, a frequency multiplication counter 105, an event counter 106, a guard counter 107, a reference counter 108, a tracking counter (angle counter) 109, and an angle counter 110 for generating injection signals and ignition signals. A signal P from the pre-scaler 101 is sent to the edge time measuring counter 103 via the frequency divider 102. The signal Pϕ is also sent to the tracking counter (angle counter) 109. The crank signal is sent to the edge time measuring counter 103, event counter 106, and guard counter 107.

Figure 4:
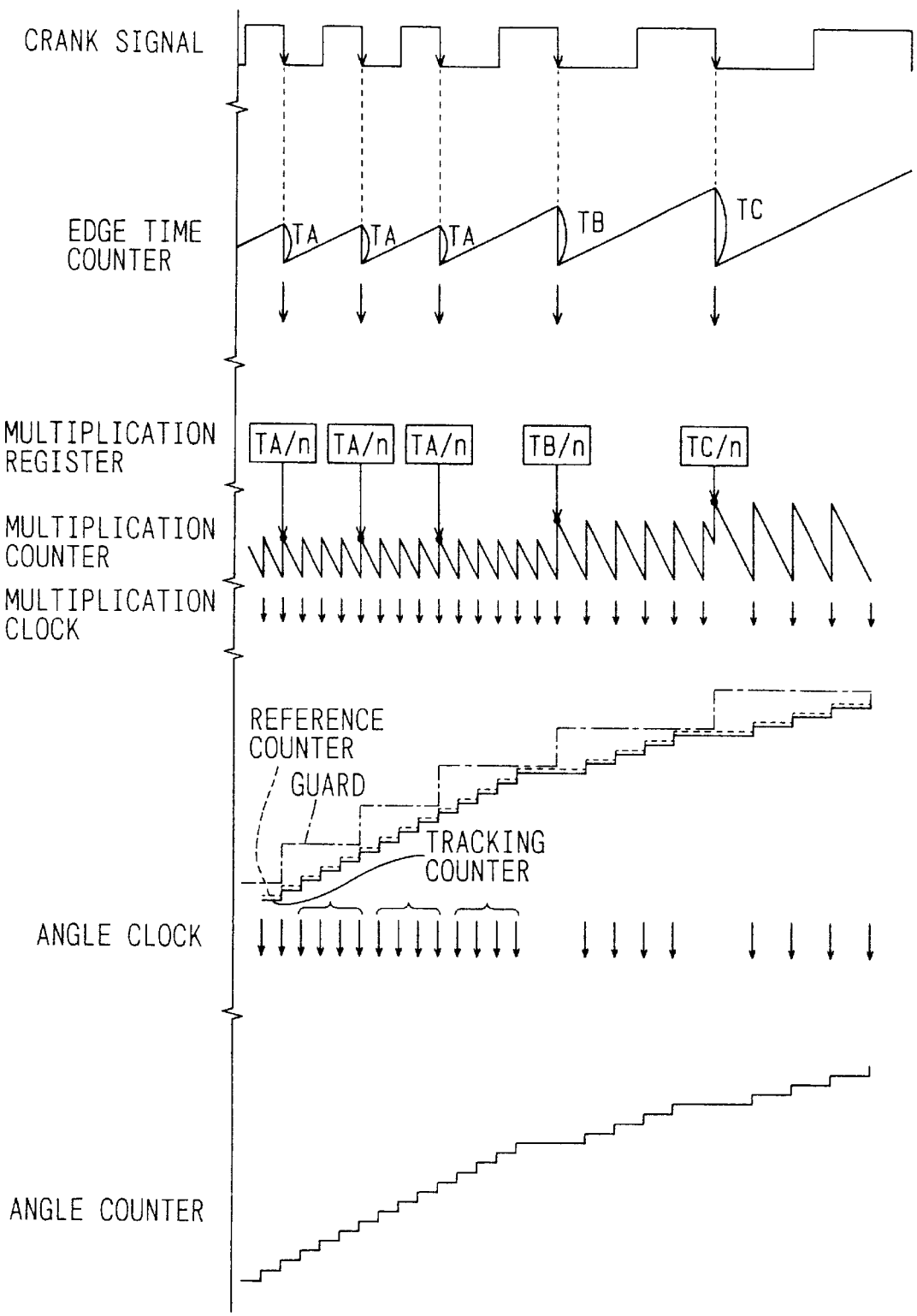
FIG. 4 is a time chart showing various signals generated by the crank signal processing hardware shown in FIG. 3.

FIG. 4 is a time chart showing generation of angle clocks (angle signals). Shown in FIG. 4 are the crank signal, the count value TA of the edge time measuring counter 103, a storage value of the frequency multiplication register 104, a count value of the frequency multiplication counter 105, an output signal (frequency multiplication clock) of the multiplication counter 105, a guard value (dot-chain line) which is (n) times as large as the value of the guard counter 107, a count value (dotted line) of the reference counter 108, a count value (solid line) of the tracking counter 109, and a count value of the angle counter 110.

The edge time measuring counter 103 in FIG. 3 receives the crank signal and measures the time between crank signal edges (pulse interval). More specifically, the edge time measuring counter 103 as pulse interval measuring means is a counter which is incremented by time synchronization as shown in FIG. 4 and measures time TA between crank edges (between trailing edges of the crank signal). The measured value is multiplied by 1/n times and resultant data is transferred to the frequency multiplication register 104 at the time of input of the crank edge. The transferred data serves as an initial value of the frequency multiplication counter 105 as a down-counter. An example of the frequency multiplication value (n) is "32".

The frequency multiplication counter 105 in FIG. 3 generates frequency multiplication clocks by multiplying the crank edge interval measured by the edge time measuring counter 103 by 1/n. Specifically, the frequency multiplication counter 105 counts down by time synchronization as shown in FIG. 4. When underflow occurs, it generates a frequency multiplication clock, and the count value is reset to the initial value TA/n. This operation is repeated. When the next crank edge (trailing edge of the crank signal) is supplied, the value of the frequency multiplication register 104 and the initial value of the frequency multiplication counter 105 are updated to the latest values. The frequency multiplication counter 105 as frequency multiplication signal generating means generates the frequency multiplication signals (frequency multiplication clocks) of integer times by the next pulse on the basis of the pulse interval of this time measured by the edge time measuring counter 103.

The reference counter 108 in FIG. 3 is incremented by the frequency multiplication clock as shown by the dotted line in FIG. 4. The tracking counter 109 in FIG. 3 is incremented by a time synchronization clock (performs a counting operation by the internal clock P.). The guard counter 107 is a counter for receiving the crank signal and is incremented by the trailing edge of the crank signal. on receipt of a crank edge, a value which is (n) times (frequency multiplication) as large as a value before the increment is transferred to the reference counter 108.

As shown in FIG. 4, the count value of the reference counter 108 cannot exceed the guard value (value of (n) times as large as the count value) transferred from the guard counter 107 when the crank edge is supplied. The guard value is shown by the dot-chain line in FIG. 4. The tracking counter 109 is incremented only when its value is smaller than the count value of the reference counter 108. Synchronously with the increment of the tracking counter 109, an angle clock (angle signal) is generated. In such a manner, the angle clock is generated by the three counters 107, 108 and 109.

In this embodiment, the internal clock (signal Pϕ from the pre-scaler) is set to 20 MHz, and the tracking counter 109 can operate at higher speed as compared with the other counters.

In FIG. 4, at the time of engine deceleration in which the crank edge interval increases with time, in the counting operations of the reference counter 108 and the tracking counter 109, the value of the reference counter 108 reaches the guard value which is (n) times as large as the value of the guard counter 107 before the crank edge is supplied, so that the increment of the tracking counter 109 is inhibited. As a result, at the time of engine deceleration, the incrementing operation of the tracking counter 109 is stopped to prevent generation of angle clocks of a predetermined number or larger.

The angle counter 110 for injection/ignition in FIG. 3 is incremented as shown in FIG. 4, each time the angle clock from the tracking counter 109 is received. The ignition and/or injection controls are performed synchronously with the crank angles by using a comparison register on the basis of the count value of the angle counter 110 for injection/ignition. That is, the controls on injection/ignition, and the like are performed synchronously with the crank angle by the angle counter 110 for injection/ignition in a hardware manner. By realizing a system which generates frequency multiplication signals (frequency multiplication clocks) at predetermined angle intervals to synchronize with the engine speed, an arithmetic operation for converting from angle to time is made unnecessary. The reduction in processing load and improvement in accuracy (when n=32, LSB=0.1875° CA) can be achieved.

The event counter 106 in FIG. 3 increments at the trailing edges of pulses of the crank signal and outputs an angle cycle interrupt signal at each edge. The CPU 11 detects the pulse missing position in the crank signal from the count value (the number of edge inputs) of the event counter 106. The count value of the event counter 106 is initialized every engine cycle (720° CA).

In operation, as shown in FIG. 2, a system initializing position is a position of BTDC 6° CA of the fourth (#4) cylinder. The tracking counter (angle counter) 109 and the angle counter 110 for injection/ignition in FIG. 3 are initialized and synchronized. Specifically, when the count value of the tracking counter 109 reaches the guard value of one cycle, the count value is reset and a reset signal is sent to the angle counter 110 for injection/ignition. When the count value of the angle counter 110 for injection/ignition coincides with the angle at the time of injection/ignition calculated by the CPU 11, an injection/ignition output can be controlled in a hardware manner. An engine control carried out based on frequency multiplication clocks while performing initialization at the front pulse missing portion in the crank signal is defined as a hardware control. In contrast, injection/ignition can be also controlled in a software manner (software control) based on the cam signal and the crank signal.

Figure 5:
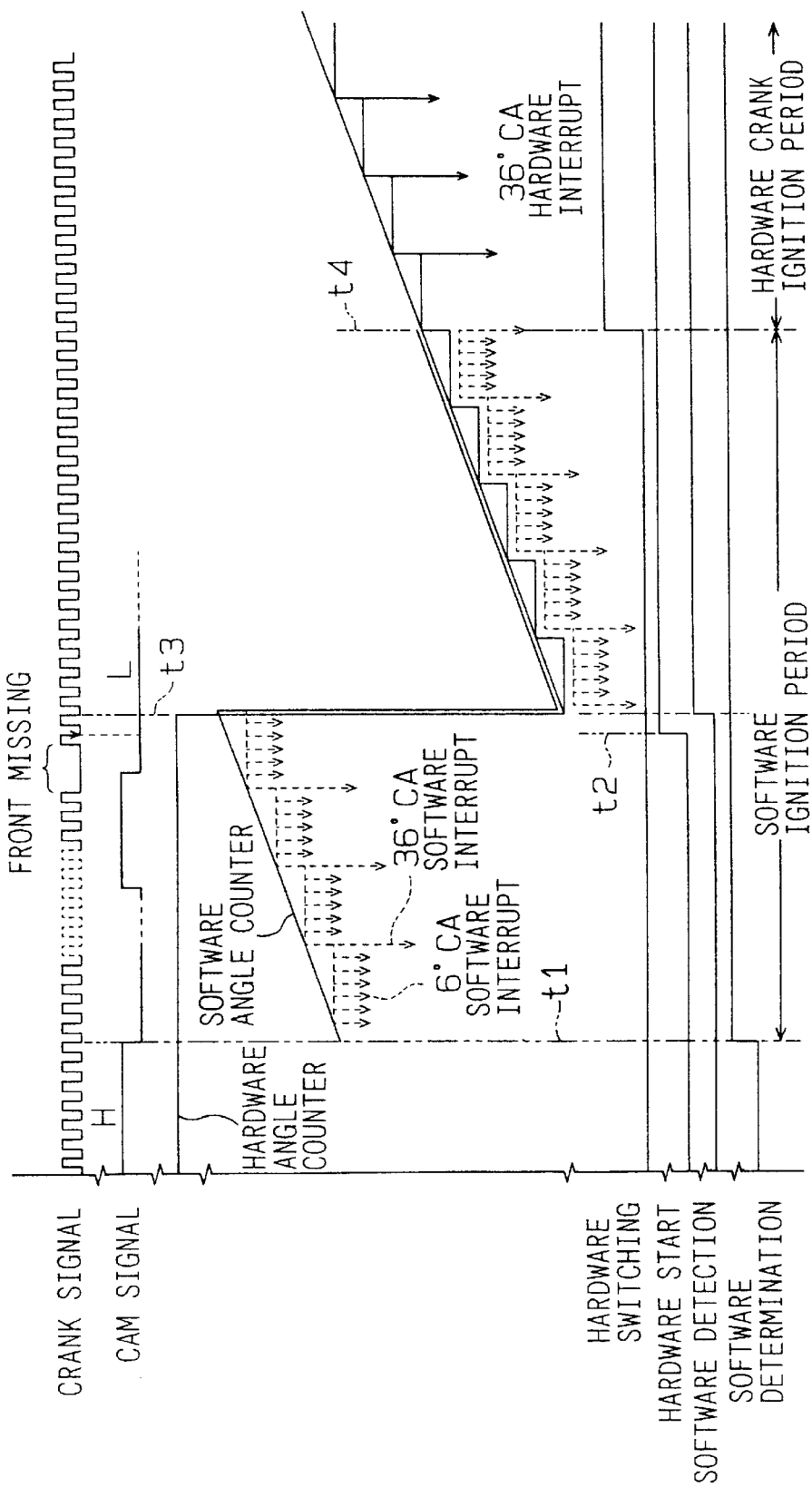
FIG. 5 is a time chart showing a switching from a software control to a hardware control in the embodiment.

FIG. 5 is a chart showing a switching from the software control to the hardware control. In FIG. 5, count values of a software angle counter used for the software control at the time of engine start and count values of a hardware angle counter (tracking counter 109 in FIG. 3) used for the hardware control after the software control are shown. The software angle counter in this embodiment is a counter function of the CPU 11, generates angle interrupt in response to the event signal generated by the edge time measuring counter 103 in FIG. 3 each time the edge of the crank signal is inputted, and is incremented.

In FIG. 5, at timing t1, cylinder determination is made by the software control and a software cylinder determination signal (flag) goes high. The cylinder determination made by the software control will be described specifically. When the front pulse missing portion in the crank signal is detected in FIG. 2, it is determined as the fourth (#4) cylinder. When the back pulse missing portion is detected, it is determined as the first (#1) cylinder. In FIG. 2, the fifth (#5), third (#3), and second (#2) cylinders are determined by the H-level periods and the L-level period (T1, T2, and T7) at the edges of the cam signals at t10, t11, and t12, respectively. Each of the H-level periods and L-level period (T1, T2, and T7) at the edges of the cam signals is calculated by the number of crank edges (the number of pulses of the crank signal).

At the timing t2 in FIG. 5, the front pulse missing position in the crank signal is detected by the software control, a start signal (flag) for the hardware control goes high. At the timing t3, the software-control pulse missing detection signal (flag) goes high. Further, at timing t4, the hardware control switching signal (flag) for switching from the software control to the hardware control goes high. That is, the period from t1 to t4 in FIG. 5 is a software-controlled ignition period. After t4, a hardware-controlled crank ignition period. In the software control from t1 to t4, interrupt of every 6° CA occurs and ignition or the like is executed, and interrupt of every 36° CA occurs, and the software control is switched to the hardware control. In the hardware control after t4, interrupt of every 36° CA occurs to execute ignition and the like.

FIG. 5 will be described more specifically. First, when the crank signal and the cam signal become effective, detection of the pulse missing portion and the cylinder determination are performed by a software logic by the crank signal and the cam signal (timing t1). With respect to the detection of the pulse missing portion, at the time of the front pulse missing portion of the crank signal, the cam signal is at the L level. At the time of the back pulse missing portion, the cam signal is at the H level. Consequently, the CPU 11 can detect (determine) the front pulse missing portion (fourth cylinder) and the back pulse missing portion (first cylinder).

By a software interrupt process, an interrupt process of every 6° CA and an interrupt process in a cycle of an angle which is obtained by frequency-dividing 6° CA (in the embodiment, interrupt of every 36° CA by 6 frequency division) are started, and instantaneous ignition (ignition performed immediately after the cylinder is determined at the engine start time) and the counting operation of the crank counter (counter which increments every 36° CA on the software) are performed. In this manner, the software control is performed. On the other hand, as a process related to the hardware control in the period from t1 to t3, the count value is set to a guard value (720° CA) of one cycle so that the hardware-controlled angle counter (tracking counter 109 in FIG. 3) does not increment to generate the angle clock until the front pulse mission portion is detected.

When the CPU 11 detects the front pulse missing portion (timing t2), at timing t3, the tracking counter 109 as a hardware-controlled angle counter starts its operation at a normal angle position. That is, operations such as generation of angle clocks, start of the angle counter 110 for ignition and injection, and interrupt of every 36° CA cycle (period) by hardware operation are started.

When the engine cranking starts just before the front pulse missing portion, however, ignition coil energization start timing may have been already passed at the timing of the front pulse missing portion, so that the energization time for ignition cannot be set as requested. Consequently, even when the hardware control by the CPU 11 is started at timing t3, the hardware control is not used at this time point but the software control is used.

After the front pulse missing portion is detected, the point at which the software control is switched to the hardware control (timing t4) is an angle position where the ignition signal is not outputted from any of the cylinders (ignition timings are not overlapped), ignition coil energization can be set with reliability (without a set delay of the CPU and a circuit operation delay) and, moreover, reference angle time for calculating an energization start angle from energization time can be calculated (in the embodiment, 144° CA is necessary as a reference angle). At this timing, the software control is switched to the hardware control.

After the timing t4, only the hardware control is performed. In such a manner, the switching from the software control to the hardware control is smoothly performed, so that the embodiment can be adapted to the instantaneous ignition system.

Specifically, in the system using the crank signal having pulse missing portions which occur twice in 720° CA as shown in FIG. 2, in 720° CA of one cycle of the engine, there is only one position at which the tracking counter 109 and the angle counter 110 for injection/ignition are initialized and synchronized. In order to determine the position of the initialization and synchronization, it is necessary to detect the reference position in the crank signal such as the missing pulse portion and provide synchronization at a predetermined angle timing by using the reference position as a reference. Until the crank reference position such as the pulse missing portion is detected, the angle counter 110 cannot be consequently operated at the right angle timings.

Since the controls on injection/ignition and the like which are synchronized with the engine speed cannot be started until the missing pulse portion is recognized, the engine cannot be started either until the missing pulse portion is detected, so that the startability of the engine lessens. In contrast, in this embodiment, even before the front pulse missing portion is detected, ignition and injection controls can be performed at the time of engine cranking.

At the time of engine stall or re-start of a starter after the hardware control is activated, when the engine is re-started by the hardware control, the startability lessens. Consequently, initialization is immediately performed, the hardware control is switched to the software control, and the software control is switched to the hardware control without fail.

Figure 6:
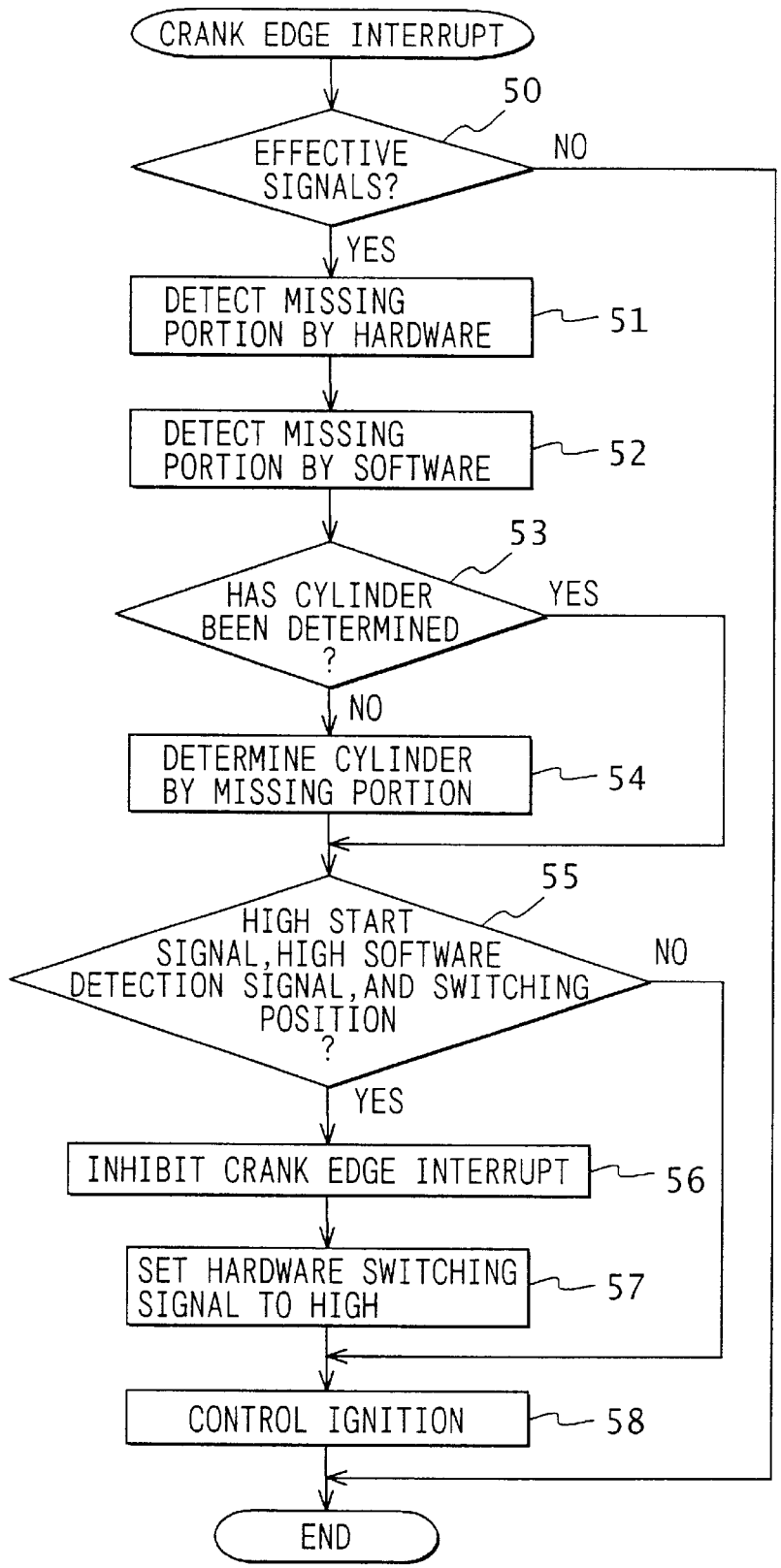
FIG. 6 is a flowchart showing a crank interrupt process at the time of the switching from the software control to the hardware control.

FIGS. 6 to 9 show flowcharts of the switching from the software control to the hardware control. The flowchart of FIG. 6 is started by a crank signal edge interrupt. First, the CPU 11 determines whether the crank and cam signals are effective or not at step 50. The crank signal is determined as effective by cancellation of a starter mask for invalidating the crank signal only for predetermined time after the starter is turned on at the time of engine start. The cam signal is determined as effective when the predetermined number of edges of the cam signal is counted. When both the crank and cam signals are effective, the CPU 11 permits the hardware control to detect a pulse missing portion and generate an interrupt at step 51.

In a pulse missing portion of the crank signal, the CPU 11 performs detection of the pulse missing portion by the software control at step 52. Specifically, a value of this time and a value of last time of the time interval between the crank edges are calculated. When the ratio between the value of last time and the value of this time is equal to or higher than a predetermined value, the CPU 11 determines a pulse missing portion.

Further, the CPU 11 checks whether the cylinder determination by the cam signal in the cam signal edge interrupt process has been finished at step 53. If NO, the CPU 11 performs the cylinder determination by detecting a pulse missing portion at step 54.

At step 55, the CPU 11 determines whether or not the front pulse missing portion for the hardware control is detected and the hardware control start signal (flag) is high, determines whether or not detection of the pulse missing portion by the software control started by the crank signal edge interrupt has completed and the software-control pulse missing portion detection signal (flag) is high, and also determines whether or not it is the switching position from the software control to the hardware control shown in FIG. 5. When the conditions are satisfied, the CPU 11 inhibits the crank signal edge interrupt at step 56. The CPU 11 sets a hardware control switching signal (flag) to high, which is indicative of the switch from the software control to the hardware control at step 57. The CPU 11 then stops the controls for ignition and the like by the interrupt under the software control after that (timing t4 in FIG. 5). After that, at step 58, the CPU 11 performs the control for ignition and the like.

On the other hand, when the switching conditions are not satisfied at step 55, the CPU 11 advances its processing to step 58 where the controls for ignition and the like are performed.

The position at which the software control is switched to the hardware control will now be described.

In FIG. 2, in the case where the engine is started just before the front pulse missing portion, the front pulse missing portion corresponds to the ignition timing of the fourth cylinder, when the control is switched at the most retard angle position (timing t50 in FIG. 2) in the advance angle range of the fourth cylinder. Therefore, time to start the coil energization of the fifth cylinder is insufficient. Since the angle corresponding to the reference angle time (time of 144° CA in the embodiment) for calculating the energization start angle from energization time has not passed from the engine start position, the reference angle time cannot be calculated. Thus, accurate ignition by the hardware control cannot be performed.

Consequently, at the position (specifically, the most retard angle position of the fifth cylinder indicated by t60 in FIG. 2) at which, even when the engine starts just before the front pulse missing portion, sufficient energization time can be assured. As a result, the reference angle time can be calculated, and accurate ignition can be set with reliability, the software control is switched to the hardware control. In the case of the configuration in which the hardware-controlled angle counter can be initialized at the value corresponding to 360° CA even in the back pulse missing portion, also when the engine starts in the back pulse missing portion, the control can be switched at the position (specifically, the most retard angle position of the second cylinder shown by t70 in FIG. 2) where accurate ignition can be set with reliability.

Figure 7:
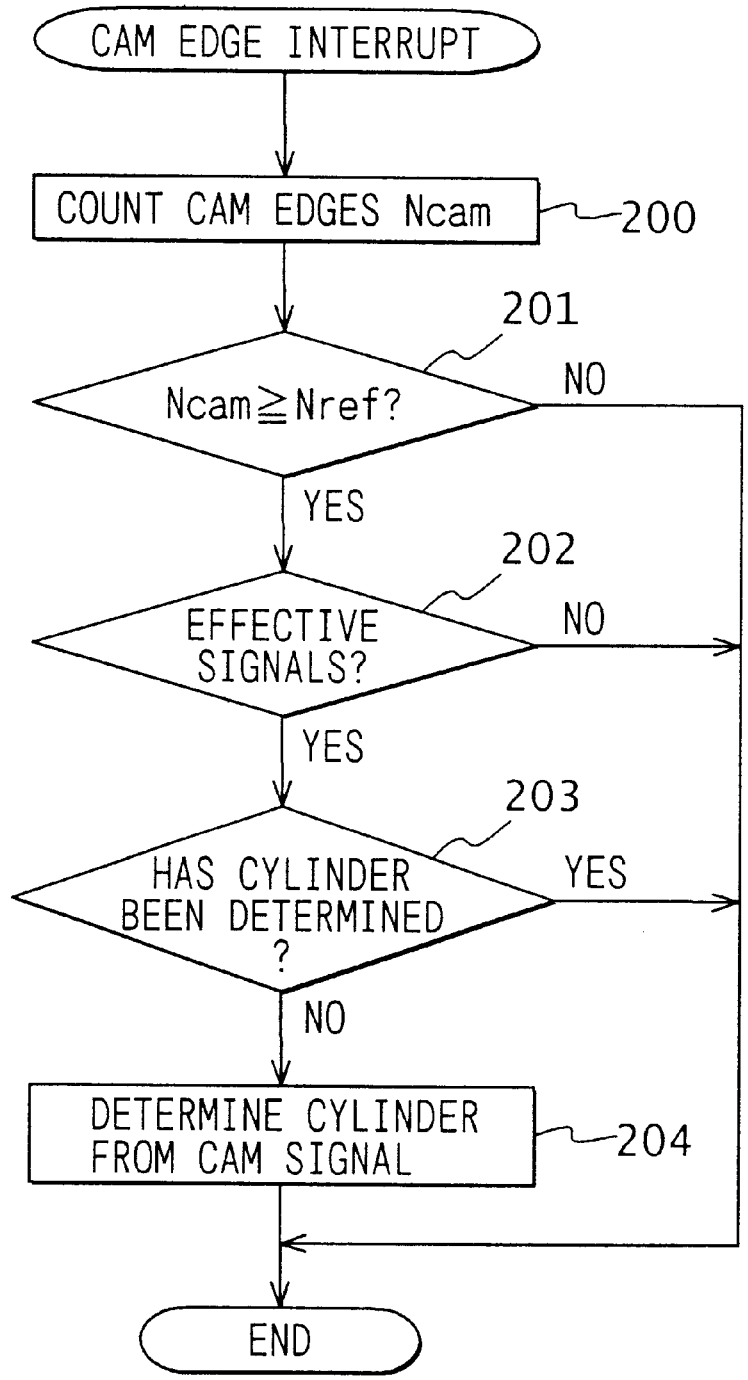
FIG. 7 is a flowchart showing a cam interrupt process at the time of the switching from the software control to the hardware control.

In the cam signal edge interrupt process of FIG. 7, at step 200, the CPU 11 counts the number of the input edges of the cam signal. At step 201, when the count value Ncam is equal to or larger than a predetermined number Nref, the CPU 11 determines that the cam signal is effective and performs the cam interrupt process. When the crank and cam signals are effective at step 202 and the cylinder determination by the pulse missing portion detection is not finished yet at step 203 (when the engine is started from a position other than the pulse missing portion), the CPU 11 advances its processing to step 204 and makes the cylinder determination from the cam signal (timings t10, t11, and t12 in FIG. 2). In this manner, the engine control can be started by the software control using the crank and cam signals.

Figure 8:
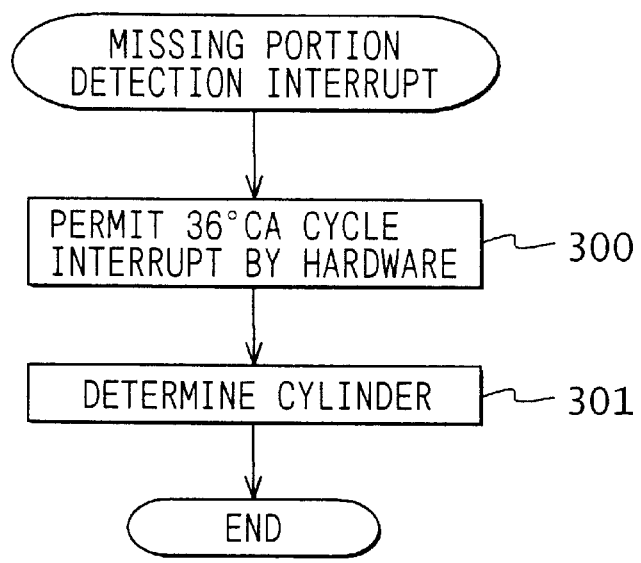
FIG. 8 is a flowchart showing an interrupt process performed in the embodiment when a pulse missing portion is detected.

When the crank and cam signals become effective and the pulse missing portion detecting function of the CPU 11 is permitted by the crank edge interrupt (step 52 in FIG. 6), a pulse missing portion detection interrupt shown in FIG. 8 is executed.

In FIG. 8, the CPU 11 permits a 36° CA cycle interrupt by the hardware control at step 300 and performs the cylinder determination at step 301. Specifically, the cylinder determination is made by determining the level (H or L) in a pulse missing portion and the number of pulses of the crank signal in the H or L level period (T5 and T6) in the cam signal just before the pulse missing portion. By the operation, the angle clock and the angle timer operate at accurate angle positions.

Figure 9:
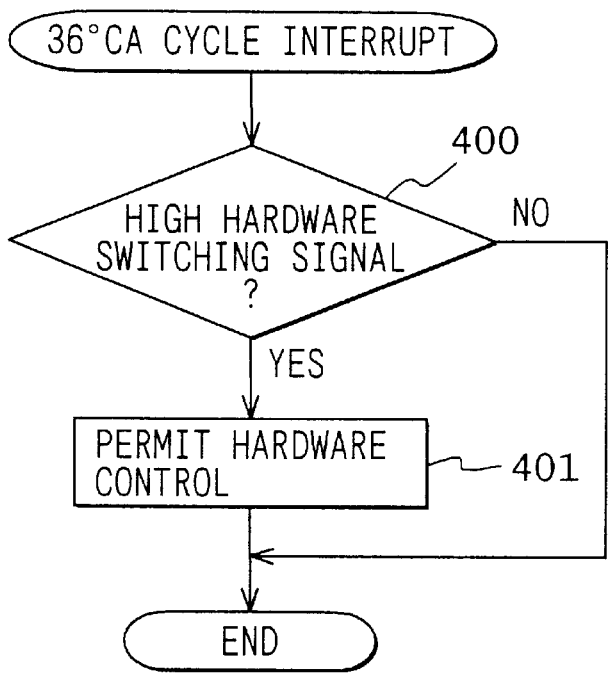
FIG. 9 is a flowchart showing an interrupt process of 36° CA cycles by the hardware control in the embodiment.

When the 36° CA cycle interrupt by the hardware control occurs at step 300 in FIG. 8, as shown in FIG. 9, the CPU 11 determines whether the hardware control switching signal (flag) indicative of the switching from the software control to the hardware control is high or not at step 400. When the signal is high, the CPU 11 permits the hardware control at step 401. After the switching, only the hardware control is performed.

Figure 10:
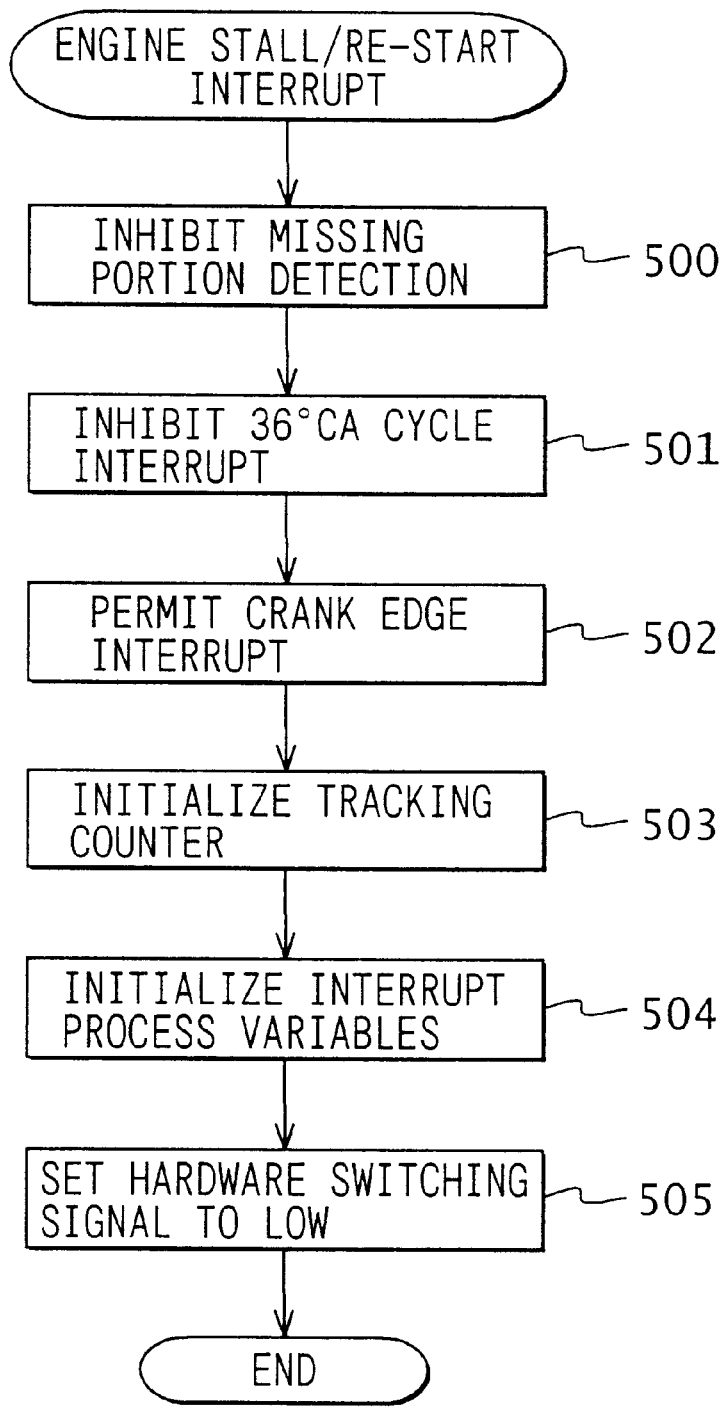
FIG. 10 is a flowchart showing an initializing process performed at the time of engine stall or re-start of a starter in the embodiment.

FIG. 10 is a flowchart showing the case of engine stall or re-start of the starter. When no pulse is sent for a predetermined time (for example, 600 ms) in a signal from the crank sensor, it is determined as an engine stall. As described above, for the predetermined time after the starter is turned on, noise occurs in the crank signal by the starter operation and it is difficult to accurately detect only the crank signal. Therefore, the crank signal is masked. When masked, it is determined that the starter is re-started. At the time of the engine stall or re-start of the starter, the process in FIG. 10 is started.

In FIG. 10, the CPU 11 inhibits the pulse missing portion detection interrupt and the 36° CA cycle interrupt of the hardware function at steps 500 and 501 to thereby inhibit the hardware control. At step 502, the CPU 11 permits the crank edge interrupt to thereby permit only software interrupt controls. Further, at step 503, the CPU 11 initializes the tracking counter 109 for generating angle clocks and the register. At step 504, the CPU 11 initializes crank edge interrupt process variables. At step 505, the CPU 11 sets the switching signal (flag) indicative of the switching from the software control to the hardware control to low.

The above embodiment has the following features.

(A) At the time of engine start, until at least a pulse missing portion (reference position) in the crank signal is detected, the CPU 11 as first and second control means and switching means performs the software control. That is, the CPU 11 executes the engine control in accordance with the cam signal specifying the cylinder position and the crank signal. The microcomputer 10 switches the control to the hardware control at a predetermined timing which is after the detection of the pulse missing portion (reference position) in the crank signal. While performing initialization at the pulse missing portion (reference position) in the crank signal, it executes the engine control based on the frequency multiplication clocks, that is, the engine control based on the angle clocks outputted in accordance with the generation of the frequency multiplication clocks.

That is, until the pulse missing portion (reference position) in the crank signal is detected, the engine control for ignition and the like is performed by the software control executed by the CPU 11 in accordance with the signal specifying the cylinder position and the crank signal. At the timing after detection of the pulse missing portion when the hardware control can be accurately performed, the software control is switched to the hardware control. Therefore, an instantaneous ignition system can be effected to perform ignition immediately after determination of the cylinder at the time of engine start, and emission can be prevented from deterioration.

In this a manner, the system which generates the frequency multiplication signals at predetermined angle intervals to obtain synchronization with the engine speed can improve the startability of the engine.

(B) The predetermined timing after detection of the reference position in the crank signal is a timing when at least the ignition timing in the ignition control can be set and the energization time can be assured. Thus, it is preferable in practical use.

(C) When engine stall occurs or the engine starter is started again after the software-controlled engine control is switched to the hardware-controlled engine control, the control is returned to the software-controlled engine control mode. Consequently, lessening in startability when the engine is re-started at the time of engine stall or re-start of the engine starter can be avoided.

Although the pulse missing portion in the pulse train of the crank signal is defined as the reference position, the reference position is not limited to the pulse missing portion. The reference position in which the pulse intervals are irregular can be also provided in a train of pulses at predetermined angle intervals in other configuration. For instance, a pulse is inserted to a pulse train.

The present invention should not be limited to the disclosed embodiment, but may be implemented in many other ways without departing from the spirit of the invention.

What is claimed is:

1. An engine control unit comprising:

pulse interval measuring means for receiving a crank signal having a reference position in a train of pulses of predetermined angle intervals corresponding to rotation of a crankshaft of an engine and measuring a pulse interval;

frequency multiplication signal generating means for generating frequency multiplication signals of integer times by the next pulse on the basis of the pulse interval of this time measured by the pulse interval measuring means;

first control means for executing an engine control based on the frequency multiplication signals while performing initialization at the reference position in the crank signal;

second control means for executing the engine control in accordance with a signal specifying a cylinder position and the crank signal; and switching means for performing the engine control by the second engine control means at least until the reference position in the crank signal is detected at the time of engine start and switching the engine control to the engine control performed by the first engine control means at predetermined timing after the reference position in the crank signal is detected.

2. The engine control unit as in claim 1, wherein:

the predetermined timing after the reference position in the crank signal is detected in the switching means is a timing when at least ignition timing can be set in an ignition control and ignition coil energization time can be assured.

3. The engine control unit as in claim 1, wherein:

the control is returned to the engine control performed by the second engine control means, when engine stall occurs or an engine starter is re-started after the engine control is switched to the engine control performed by the first engine control means by the switching means.

4. The engine control unit as in claim 1, wherein:

the reference position in the crank signal is the pulse missing portion in the pulse train.

5. The engine control unit as in claim 1, wherein:

the second control means includes a CPU which performs the engine control while executing an interrupt process in response to a pulse edge of the crank signal.

6. The engine control unit as in claim 5, wherein:

the second control means executes the engine control by software.

* * * * *